United States Patent

Lin

[11] Patent Number: 5,355,746
[45] Date of Patent: Oct. 18, 1994

[54] MOUNT FOR OPTIONAL EQUIPMENT FOR BICYCLES

[75] Inventor: Michael Lin, Taichung, Taiwan
[73] Assignee: Topeak Inc., Taichung, Taiwan
[21] Appl. No.: 102,070
[22] Filed: Aug. 4, 1993
[51] Int. Cl.⁵ .................................... B62K 21/12
[52] U.S. Cl. ............................ 74/551.8; 74/551.1;
 403/191; 280/288.4; 362/72
[58] Field of Search ................... 74/551.1–551.8;
 403/191; 280/282, 281.1, 287, 288.4; 362/72

[56] References Cited

U.S. PATENT DOCUMENTS

| | | | |
|---|---|---|---|
| 3,331,617 | 7/1967 | Jacoby | 280/279 |
| 4,433,899 | 2/1984 | Sellet et al. | 74/551.8 X |
| 4,477,865 | 10/1984 | Tsuyama | 362/72 |
| 4,507,105 | 3/1985 | Stottmann et al. | 403/191 |
| 4,516,873 | 5/1985 | Humble et al. | 403/191 |
| 4,577,261 | 3/1986 | Tsuyama | 74/551.8 X |
| 4,621,826 | 11/1986 | Ziegler | 280/282 X |
| 4,625,264 | 11/1986 | Nagashima | 362/72 |
| 4,722,031 | 1/1988 | Matsuyama et al. | 362/72 |
| 4,873,886 | 10/1989 | Renner | 74/551.1 X |
| 5,148,327 | 9/1992 | Gaxiola | 74/551.8 |
| 5,154,095 | 10/1992 | Giard | 74/551.1 |
| 5,181,774 | 1/1993 | Lane | 362/72 |
| 5,226,340 | 7/1993 | Takeda | 74/551.8 |

FOREIGN PATENT DOCUMENTS

| | | | |
|---|---|---|---|
| 4029012 | 5/1992 | Fed. Rep. of Germany | 280/287 |
| 4137323 | 5/1993 | Fed. Rep. of Germany | 362/72 |
| 91/00686 | 10/1991 | PCT Int'l Appl. | 74/551.8 |

Primary Examiner—Vinh T. Luong
Attorney, Agent, or Firm—Charles E. Baxley

[57] ABSTRACT

A mount for optional equipment for bicycles. The mount is mounted on handle bars of bicycles. A number of pairs of flanges are attached to or formed on the mount. A pair of flanges is attached to or formed on each item of optional equipment. The pairs of flanges attached to or formed on the mount engage with the pairs of flanges attached to or formed on the items of optional equipment, so that the items of optional equipment are mounted on the mount in a quickrelease way.

9 Claims, 4 Drawing Sheets

MOUNT FOR OPTIONAL EQUIPMENT FOR BICYCLES

BACKGROUND OF INVENTION

1. Field of Invention

The present invention relates to a mount for optional equipment for bicycles. The mount is mounted on handle bars of bicycles. A number of pairs of flanges are attached to or formed on the mount. A pair of flanges is attached to or formed on each optional equipment. The pairs of flanges attached to or formed on the mount engage with the pairs of flanges attached to or formed on the optional equipment, so that the optional equipment are mounted on the mount in a quick-release way.

2. Related Prior Art

Various items of optional equipment are required for bicycles for various purposes. For example, baskets are necessary for shopping, lamps are useful for riding at night, meters are essential for measuring speed or miles traveled. Various combinations of items of optional equipment are mounted on bicycles in various conditions. It is preferred that those items of optional equipment can be easily mounted on bicycles and can be easily detached from bicycles. This is a long and unfulfilled need. Therefore, the present invention is intended to satisfy such a need.

SUMMARY OF INVENTION

It is an object of the present invention to provide a mount for optional equipment for bicycles. The mount is mounted on handle bars of bicycles. A number of pairs of flanges are attached to or formed on the mount. A pair of flanges is attached to or formed on each item of optional equipment. The pairs of flanges attached to or formed on the mount engage with the pairs of flanges attached to or formed on the items of optional equipment, so that the items of optional equipment are mounted on the mount in a quickrelease way.

For a better understanding of the present invention and objects thereof, a study of the detailed description of the embodiments described hereinafter should be made in relation to the accompanying drawings.

DETAILED DESCRIPTION OF PREFERRED EMBODIMENT

Figure 1:
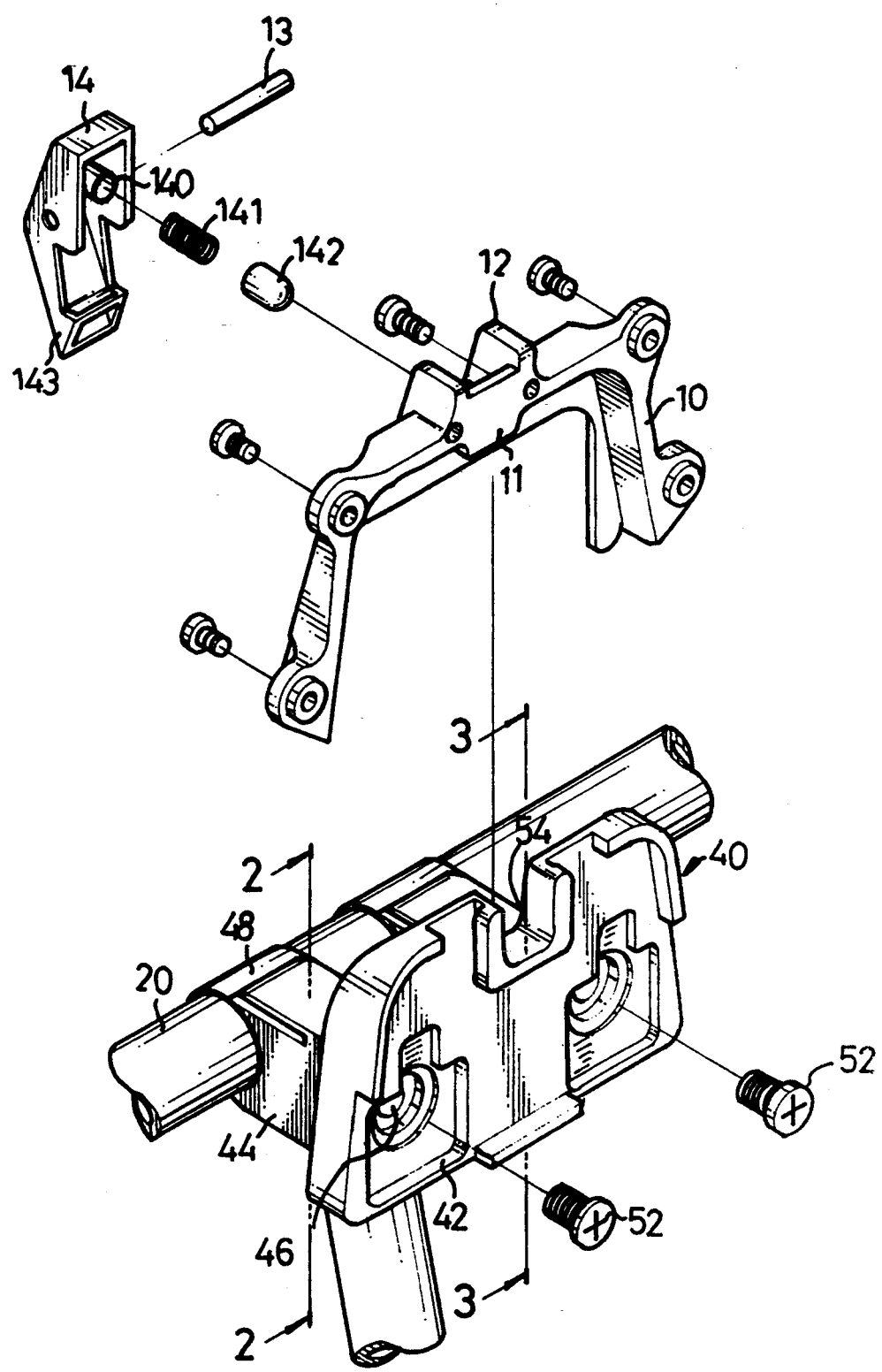
FIG. 1 is an exploded view of a mount in accordance with the preferred embodiment of this invention.

Referring to FIG. 1 of the drawings, a mount 40 is a substantially trapezoidal plate with two recesses 42 formed in a first side thereof and two tubular portions 44 formed on a second side thereof. Within the recesses 42, two holes are formed through the mount 40. Each tubular portion 44 is defined by means of two vertical walls and two horizontal walls. Each vertical wall of each tubular portion 44 has a concave semi-circular rim. A handle bar 20 of a bicycle engages with the concave semi-circular rims of the tubular portions 44 when the mount 40 is mounted on the handle bar 20 by two steel strips 48 engaging with two bolts 52.

Figure 2:
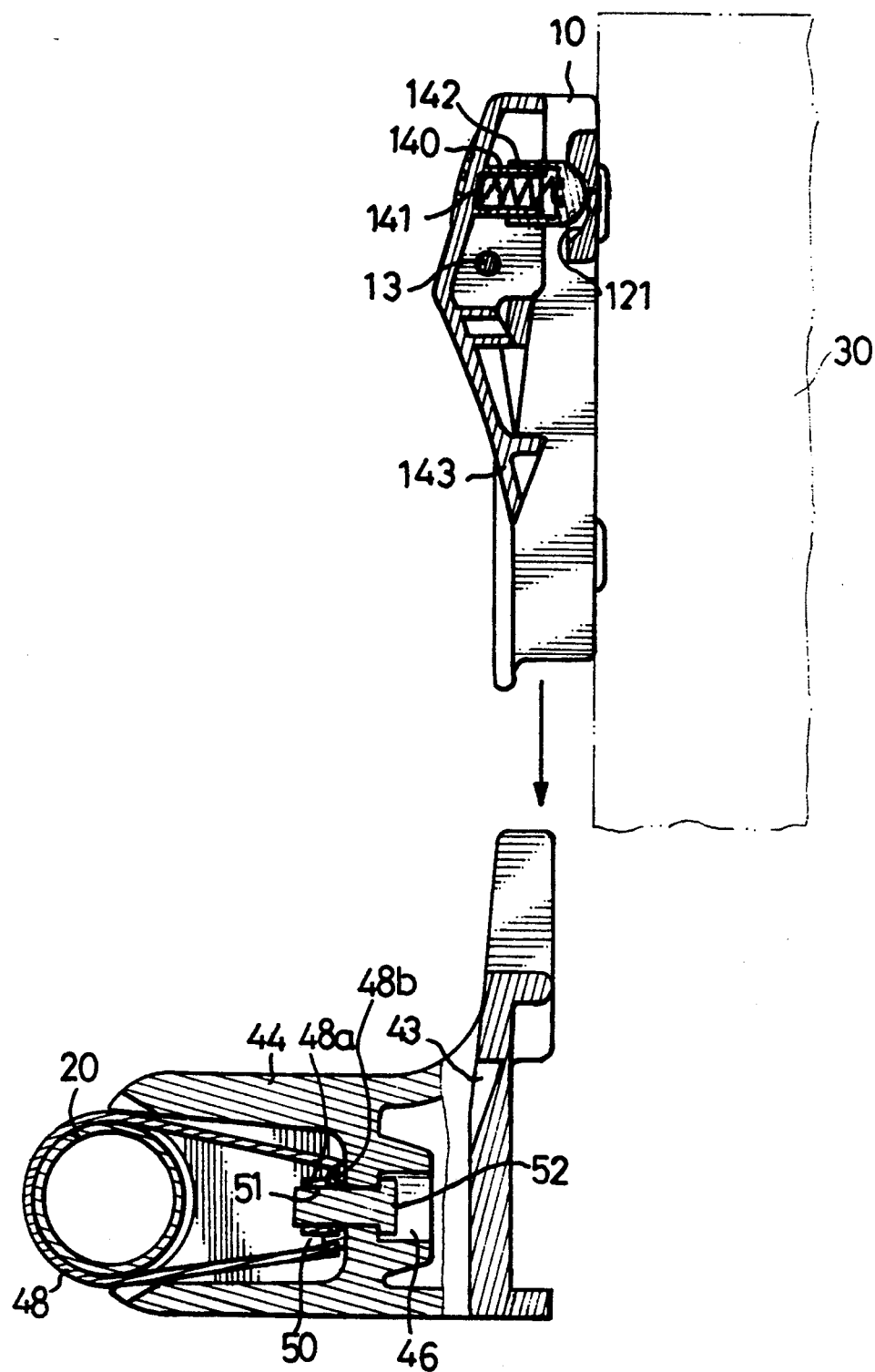
FIG. 2 is a cross-sectional view of a clamp for mounting a basket on the mount according to the preferred embodiment this invention.

Referring to FIG. 2 of the drawings, each steel strip 48 has a hole 49 defined in a first tip 51 thereof and a hole 51 formed in a second tip 48b thereof. A nut 50 is fixed in the hole formed in the first tip of each steel strip 48 and a threaded hole axially formed therethrough. The steel strips 48 are curved about the handle bar 20. The first and second tips 48a and 48b of the steel strips 48 are disposed in the tubular portions 44 so that the threaded holes defined in the nuts 50 align with the holes formed in the second tips 48b. Two bolts 52 each defining a threaded body and a head are inserted through the holes 46, so that the threaded bodies are secured in the threaded holes. The tubular portions 44 are thus moved towards the handle bar 20, so that the concave semi-circular rims abut against the handle bar 20. As a result, the mount 40 is firmly mounted on the handle bar 20.

Referring to FIG. 1 of the drawings, a clamp has a frame 10 with a substantially inverted U-shaped form. A number of holes are formed in the frame 10. A number of screws are inserted through the holes formed in the frame 10 and are further secured into a basket 30. The frame 10 is thus attached to the basket 30. The frame 10 is configured corresponding to the mount 40 so that the frame 10 can be mounted on the mount 40. At the middle point of the frame 10, there is formed a protrusion 11 for engaging in a recess 54 formed in the mount 40 in view of positioning the frame 10 relative to the mount 40.

Two ears 12 each defining a hole are transversely formed on the frame 10. A recess 121 is formed in the frame 10, between the ears. A buckle 14 has a passage transversely formed therethrough. A pin 13 is received in the holes formed in the ears 12 and the passage formed through the buckle 14, so that the buckle 14 is pivotally mounted on the frame 10.

Figure 3:
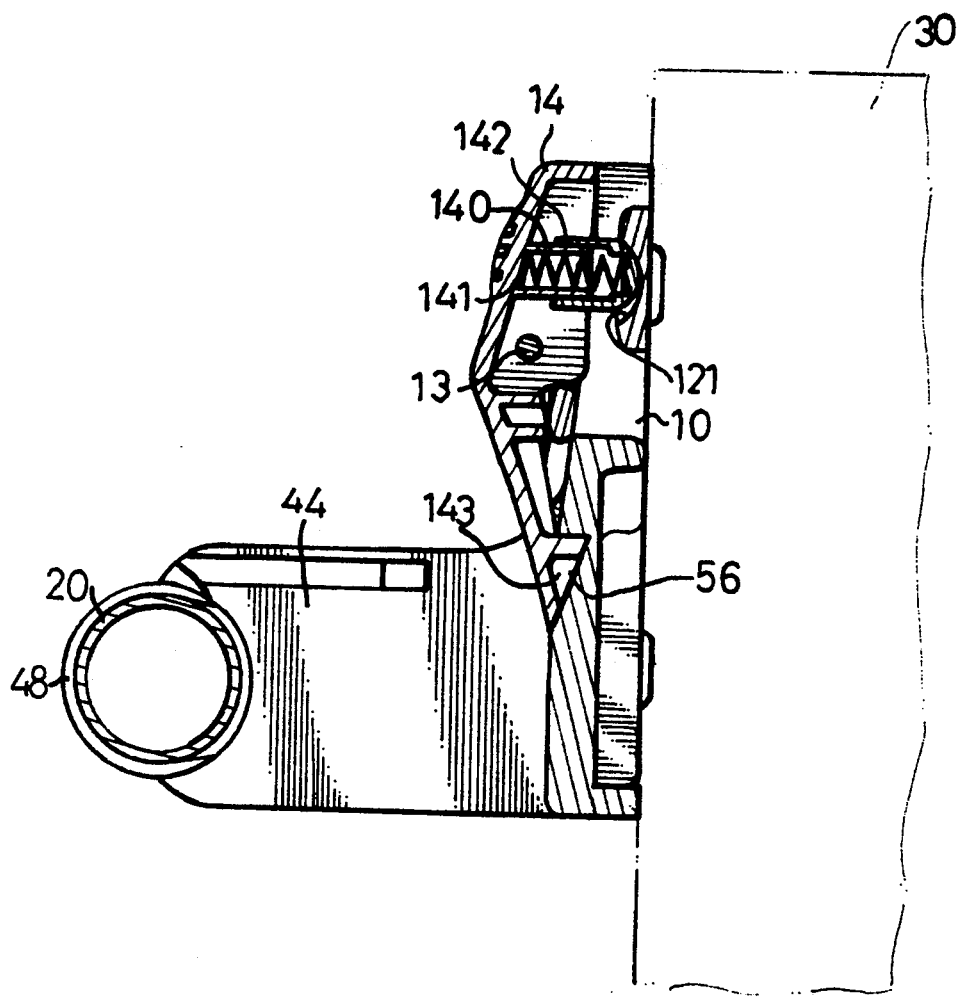
FIG. 3 is a view similar to FIG. 2, however, it shows the basket mounted, by means of the clamp, on the mount according to the preferred embodiment of this invention.

Referring to FIG. 3 of the drawings, on a first end of the buckle 14, there is formed a tubular portion 140 for receiving a spring 141 further received in a socket 142 engaged in the recess 121. A hook 143 is formed on the second end of the buckle 14. The first end of the buckle 14 is thus biased, by means of the spring 141, away from the frame 10. Accordingly, the hook 143 is biased, by means of the spring 141, in order to engage in a recess 56 formed in the second side of the mount 40 when the frame 10 is mounted on the mount 40. Thus, the basket 30 is firmly mounted, by means of the engagement of the clamp with the mount 40, on the handle bar 20.

Figure 4:
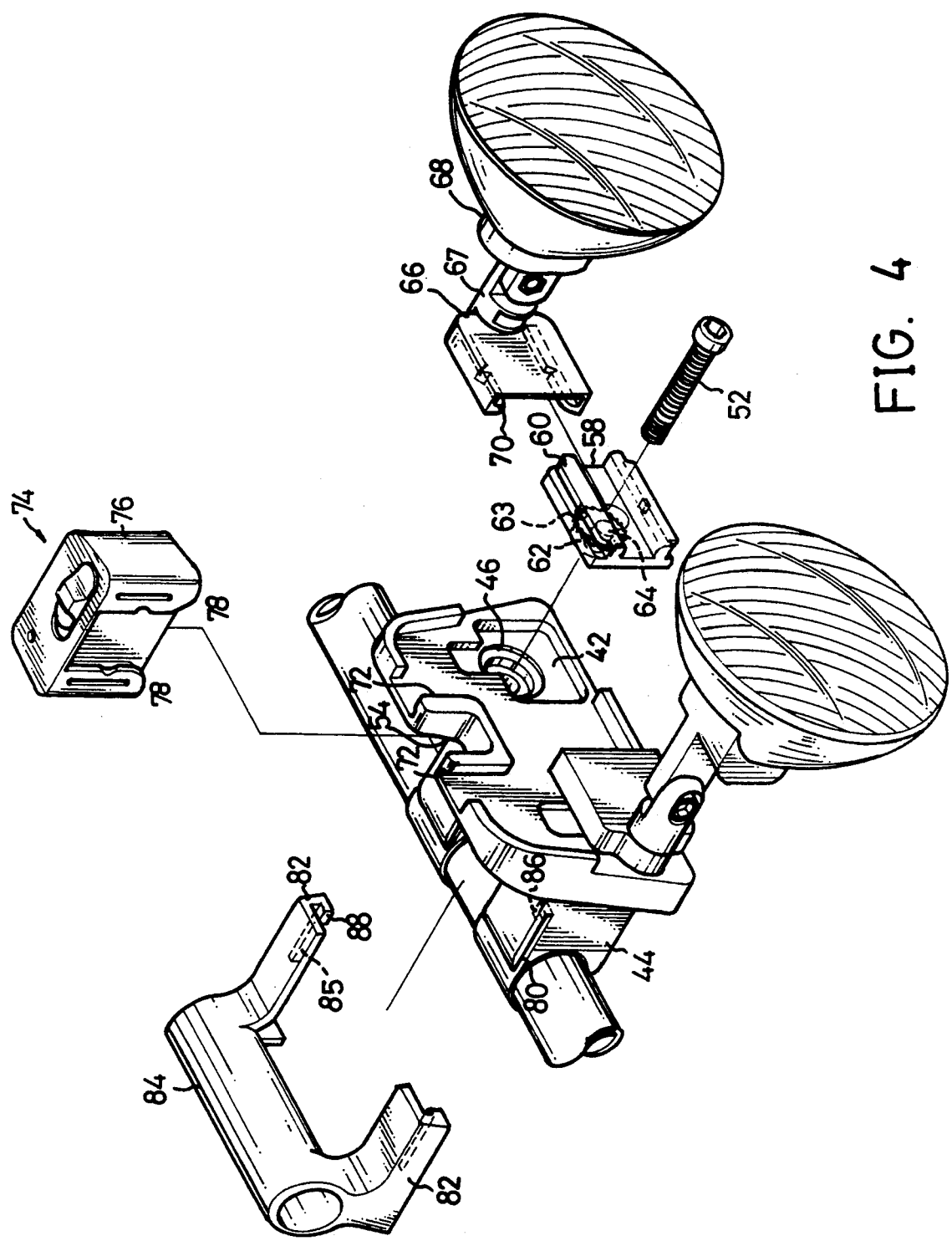
FIG. 4 is an exploded view of a number of items of equipment to be mounted on the mount in accordance with the preferred embodiment of the present invention.

Referring to FIG. 4 of the drawings, two rail members 58 each have two flanges 60 formed on a first side thereof and a boss 62 formed on a second side thereof. Each boss 62 has a hole 64 axially formed therethrough. The rail members 58 are received in the recesses 42 so that the bosses 62 are received in the holes 46. The threaded bodies of the bolts 52 are inserted through the holes 64 and 46 and are further secured in the threaded holes formed in the nuts 50, so that the rail members 58 are attached to the mount 40 which is mounted on the handle bar 20.

Two slides 66, each of which is substantially a plate defining an ear defining a hole. Each of two joints 67 is substantially a cylinder having a threaded hole axially formed in a first end thereof and a tab formed on a second end thereof. Each of two threaded bolts is inserted through the hole formed in each slide 66 and is further secured in the threaded hole formed in each joint 67. The tab of each joint 67 defines a hole. Each of two lamps 68 has a seat defining a tab defining a hole. Each of two threaded bolts is inserted through the hole formed in the tab of each joint 67 and the hole formed in the tab of the seat of each lamp 68, and is further secured in a threaded nut. Thus, the lamps 68 are pivotally mounted on the slides 66. Each of the slides 66 has a pair of flanges 70 formed thereon. The flanges 60 are slidably engageable with the flanges 70 so that the lamps 68 are detachably mounted on the mount 40. There is a snapping member formed near each flange 60, and there is a cutout formed in each flange 70. The snapping members are engageable in the cutouts so that the flanges 66 will not be easily removed from the rail members 58.

Two flanges 72 are formed on the first side of the mount 40. A switch 74 has a housing 76 having two flanges 78 for engaging with the flanges 72. Each flange 78 defines a cutout for engaging with a snapping member formed near each flange 72, so that the switch 74 will not be easily removed from the mount 40.

Two slots 80 are formed in the tubular portions 44 so that the slots 80 face away from each other. A support 81 has a top beam 84 and two arms transversely projecting from the top beam 84. Each arm 82 has a flange 85 longitudinally formed thereon. The flanges 85 are slidably engageable in the slots 80 so that the top beam 84 is mounted on the mount 40. Two recesses 86 are formed in the slots 80. Two snapping members 88 are formed on the flanges 85. The recesses 86 are engageable with the snapping members 88 so that the top beam 84 will not be easily removed from the mount 40. Some items of optional equipment, e.g., a meter, can be mounted on the top beam 84.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

I claim:

1. A mount in combination with a handle bar for optional equipment for bicycles, comprising:
   a plate comprising at least one hole formed therein, at least one pair of flanges formed on a first side thereof and at least one tubular portion formed on a second side thereof, the pair of flanges engaging with a pair of flanges formed on a slide attached to optional equipment;
   at least one steel strip comprising a nut attached on a first tip thereof and a hole formed in a second tip thereof, the first and second tips of the steel strip disposed in the tubular portion; and
   at least one bolt inserted through the hole formed in the mount and the hole formed in the second tip of the steel strip and further engaged in the nut so that the tubular portion is moved towards the handle bar and that the tubular portion abuts against the handle bar and that the mount is firmly mounted on the handle bar.

2. A mount in accordance with claim 1, wherein the tubular portion comprises a concave semi-circle rim for matching the handle bars.

3. A mount in accordance with claim 1 wherein each of the tubular portions of the mount defines a slot.

4. A mount in accordance with claim 3 comprising a support comprising a top beam, two arms transversely projecting from the top beam and two flanges each longitudinally extending on a corresponding one of the arms, whereby the flanges of the support are engagable with the slots defined in the tubular portions of the mount so that the support is mounted on the mount for supporting optional equipment.

5. A mount in combination with a handlebar for items of optional equipment for bicycles, comprising:
   a plate comprising at least one formed therethrough, at least one rail member mounted on a first side thereof and at least one tubular portion formed on a second side thereof, the rail member comprising a pair of flanges formed thereon for engaging with a pair of flanges formed on a slide attached to items of optional equipment;
   at least one steel strip comprising a nut formed on a first tip thereof and a hole formed in a second tip thereof, the first and second tips of the steel strip disposed in the tubular portion; and
   at least one bolt inserted through the hole formed in the mount and the hole formed in the second tip of the steel strip and further engaged in the nut so that the tubular portion is moved towards a handle bar and that the tubular portion abuts against the handle bar and that the mount is firmly mounted on the handle bar.

6. A mount in accordance with claim 5, wherein the tubular portions each comprise a tip with a form compensated to that of the handle bars.

7. A mount in accordance with claim 5, wherein the rail member defines a hole through which a threaded body of the bolt is insertable so that the rail member is mounted on the first side of the mount.

8. A mount in accordance with claim 5 wherein each of the tubular portions of the mount defines a slot.

9. A mount in accordance with claim 8 comprising a support comprising a top beam, two arms transversely projecting from the top beam and two flanges each longitudinally extending on a corresponding one of the arms, whereby the flanges of the support are engagable with the slots defined in the tubular portions of the mount so that the support is mounted on the mount for supporting optional equipment.

* * * * *